Oct. 4, 1960     G. M. T. HALLOCK     2,954,988
SAFETY CHAIN CONNECTION FOR TRAILER HITCH
Filed Dec. 9, 1959
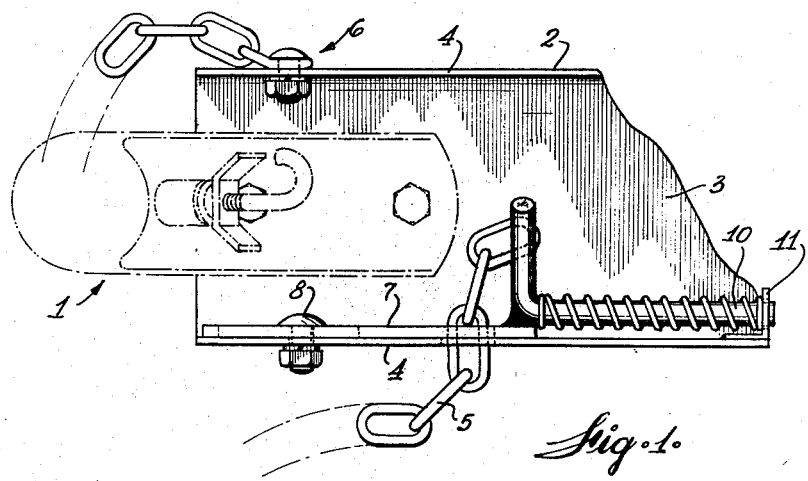
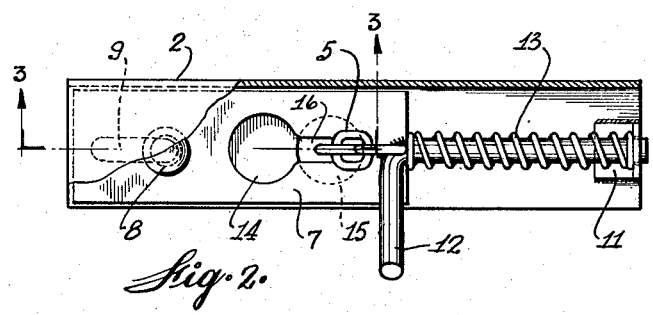
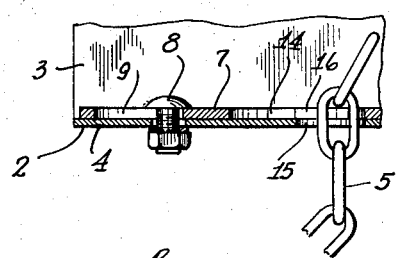
INVENTOR
Goldwin M. T. Hallock
BY Alex. E. MacRae
ATTORNEY

United States Patent Office 2,954,988
Patented Oct. 4, 1960

2,954,988

SAFETY CHAIN CONNECTION FOR TRAILER HITCH

Goldwin M. T. Hallock, Fenelon Falls, Ontario, Canada

Filed Dec. 9, 1959, Ser. No. 858,527

2 Claims. (Cl. 280—457)

This invention relates to trailer hitches and more particularly to a safety chain connection therefor.

It is usual in trailer hitches to provide an auxiliary chain connection for safety purposes. It is desirable that such safety chains be capable of rapid and convenient connection and various types of connecting means therefor, including hooks, snaps, thumb nuts, and clevises, have heretofore been proposed. However, such means frequently fail in operation. Thus, hooks may come undone by certain movements of the chain on rough roads. Snaps may also come undone as a result of a particular twist of the chain or they may break if subjected to a sudden jerk. A bolt through a chain and a thumb nut to hold it will come undone due to vibration unless tightened with pliers or wrench. A clevis will also loosen unless frequently tightened with pliers. Other types of fastening means suffer from various disadvantages such as the presence of bulky or awkward mounting elements and lack of adequate strength of such mounting elements.

It is an object of this invention to provide a safety chain connection for a trailer hitch which may be simply and inexpensively associated with a trailer hitch, which does not substantially increase the overall bulk of the hitch, which possesses adequate strength under operating conditions, and which is safe effective and convenient in use.

The invention comprises, in combination with a trailer hitch having a channel frame member and a safety chain having one end fixed to said member, a safety chain connection having a plate slidably mounted on one of the walls of said member, said plate and said wall having registering openings therein for passage of said chain therethrough, and a spring urging said plate in one direction of movement and normally holding said plate in one position on said wall, said openings being out of registry in said one position, said plate being manually movable in its opposite direction of movement to place said openings in registry, said plate having a slot leading from said opening therein to receive a link of said chain when said openings are out of registry.

The invention will be described with reference to the accompanying drawing, in which Figure 1 is a plan view of a trailer hitch and safety chain connection in accordance with the invention, Figure 2 is a side elevation partly in section, and Figure 3 is a section on line 3—3 of Figure 2.

In the drawing, 1 is a conventional trailer hitch mounted on a metal channel frame member 2 having a bottom wall 3 and side walls 4.

A safety chain 5, which is adapted to be looped around a portion of a vehicle in the usual manner, has one end anchored at 6 to one side wall 4 of the channel 2. Means for fastening the other end of the chain to the other side wall 4 comprises a metal plate 7 slidably mounted on the inner surface of such side wall as by means of a pin or bolt 8 fixed to side wall 4 and extending through a slot 9 in the plate adjacent one end thereof. A rod 10 is fixed to the other end of the plate and extends outwardly therefrom, the outer end portion of the rod being slidably supported in a lug 11 fixed to side wall 4. The rod 10 is provided with a handle portion 12 extending angularly from the end thereof fixed to the plate. A spring 13 is mounted on the rod between lug 11 and plate 7. It will be observed that the spring 13 urges the plate in one direction of movement and normally holds the same in one position with bolt 8 engaging one end wall of slot 9. It will also be apparent that, by grasping handle 12, the plate 7 may be manually reciprocated in its other or opposite direction of movement until bolt 8 engages the other end wall of slot 9 to define a second position of the plate with respect to the channel side wall 4.

Plate 7 has an opening 14 therein of a diameter sufficient to permit easy passage therethrough of the chain 5. Side wall 4 also has an opening 15 therein of substantially the same size as opening 14 and arranged to register therewith in the second or manually located position of the plate 7 described above but substantially completely out of registry therewith in the first or at rest position of the plate under the influence of spring 13. Plate 7 also has a slot 16 therein extending from opening 14 and arranged to extend diametrically across opening 15 in the first or at rest position of the plate. The width of slot 16 is such as to permit convenient reception therein of a single link of chain 5. Thus, the width of the slot is but slightly greater than the diameter of the chain link material whereby it prevents passage therethrough of adjoining links of the chain.

In use, plate 7 is manually reciprocated to place openings 14 and 15 in registry and the free end portion of chain 5 passed through such openings (after having been looped through a vehicle part). The plate 7 is then allowed to move in the opposite direction, under the influence of spring 13, and an appropriate link of the chain enters slot 16 to permit such movement. It will be apparent that, when the plate 7 reaches its at rest position (as shown in the drawings) the end portion of the chain will be locked in its looped position since one of its links will be effectively and positively retained in slot 16.

It will be observed that the fastening means described will be unaffected by vibrations, road shocks and the like resulting from operation of the vehicle and trailer to which it is attached. Moreover, since the fastening means is almost wholly contained within the interior of the channel 2 whereby it does not increase the bulk of the hitch. Since operation of the fastening means resides in a simple reciprocating movement, it is very convenient in use. Such periodical reciprocating movement results in a minimum of wear of the parts. Should, however, it be necessary to replace the spring 13, this may be readily accomplished. An important advantage of the structure described resides in the fact that there are no parts requiring periodical tightening or adjustment. Thus, the device is substantially failureproof even in the hands of unskilled or careless operators.

I claim:

1. A trailer hitch structure comprising a channel frame member having a flat bottom wall and first and second flat parallel side walls in perpendicular relation to said bottom wall, and a safety chain connection comprising a safety chain having one end fixed to said first side wall and a flat plate slidably mounted on said second side wall and in engagement with said second side wall from end to end of said plate, said plate and said second side wall having registering openings therein for passage therethrough of said chain, said plate being slidable to a first position to place said openings in registry and to a second position to place said openings out of registry, a spring normally holding said plate in said second position, and a handle fixed to said plate for manually moving said plate to said first position against the action of said spring, said plate having a slot therein leading from said opening therein to receive a link of said chain when said openings are out of registry.

2. A trailer hitch structure comprising a channel frame member having a flat bottom wall and first and second flat parallel side walls in perpendicular relation to said bottom wall, and a safety chain connection comprising a safety chain having links therein, said chain having one end fixed to said first side wall, a flat plate slidably mounted on said second side wall and in engagement therewith from end to end of said plate, said plate and said second side wall having registering openings therein for passage therethrough of said chain, said plate being slidable to a first position to place said openings in registry and to a second position to place said openings out of registry, a rod fixed in parallel relation to said plate and extending outwardly from one end thereof, a lug fixed to said second side wall and slidably supporting the extending end of said rod, a spring mounted on said rod and normally holding said plate in said second position, a handle fixed to said rod for manually moving said plate to said first position against the action of said spring, said plate having a slot therein leading from said opening therein to receive a link of said chain when said openings are out of registry, said slot having a width less than the width of each said link, said slot extending diametrically across said opening in said second side wall when said openings are out of registry.

References Cited in the file of this patent

UNITED STATES PATENTS

| | | |
|---|---|---|
| 1,450,176 | Hopkins | Apr. 3, 1923 |
| 2,105,714 | West | Jan. 18, 1938 |
| 2,196,115 | Jacobson | Apr. 2, 1940 |
| 2,527,866 | Welch | Oct. 31, 1950 |
| 2,726,099 | Nunn | Dec. 6, 1955 |